R. C. SCAIFE.
STEERING COLUMN SWITCH UNIT.
APPLICATION FILED AUG. 27, 1914.

1,282,954.

Patented Oct. 29, 1918.

2 SHEETS—SHEET 1.

Witnesses
E. B. Gilchrist
A. J. Hudson

Inventor
Richard C. Scaife
by Thurston & King
attys

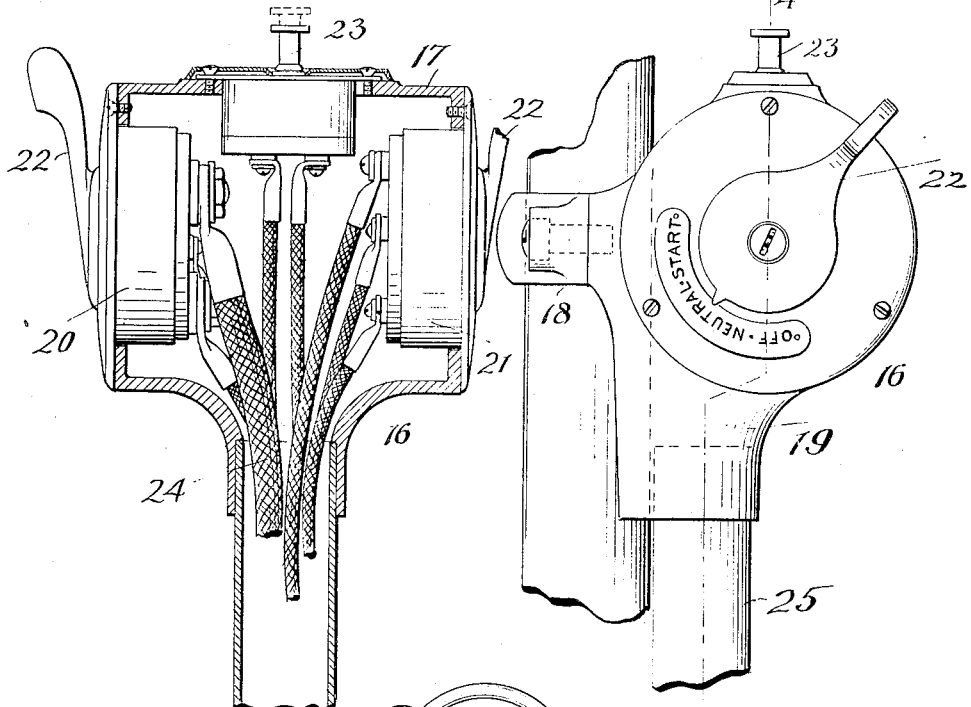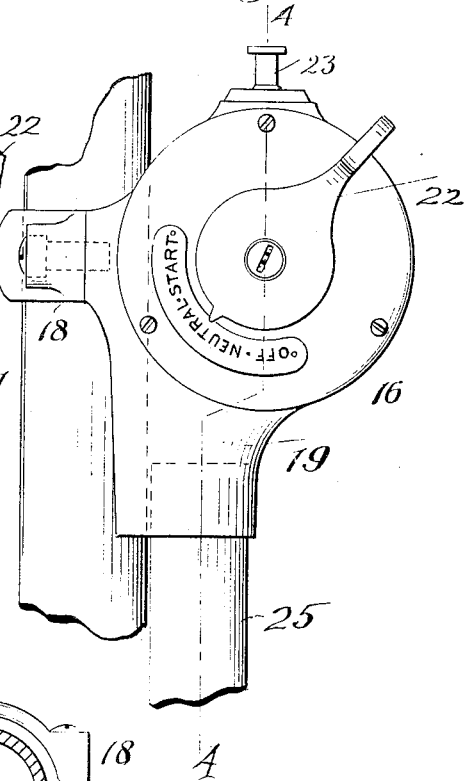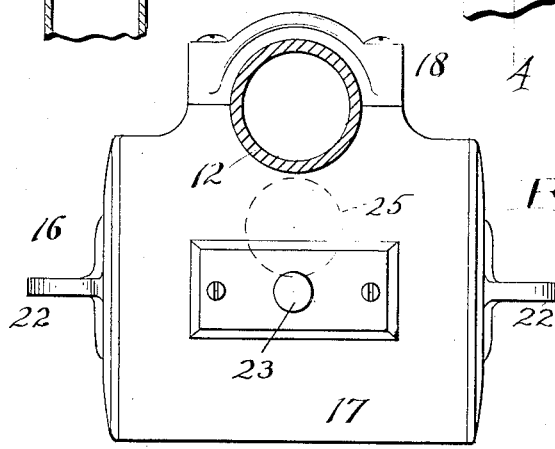

UNITED STATES PATENT OFFICE.

RICHARD C. SCAIFE, OF CLEVELAND, OHIO, ASSIGNOR, BY MESNE ASSIGNMENTS, TO THE WHITE MOTOR COMPANY, OF CLEVELAND, OHIO, A CORPORATION OF OHIO.

STEERING-COLUMN SWITCH UNIT.

1,282,954.     Specification of Letters Patent.     Patented Oct. 29, 1918.

Application filed August 27, 1914. Serial No. 858,892.

*To all whom it may concern:*

Be it known that I, RICHARD C. SCAIFE, a citizen of the United States, residing at Cleveland, in the county of Cuyahoga and State of Ohio, have invented a certain new and useful Improvement in Steering-Column Switch Units, of which the following is a full, clear, and exact description.

This invention relates to controlling apparatus for the starting and lighting system of a motor vehicle, and has for its object to provide a controlling apparatus in the form of a unit and to mount the same on the steering column in such a manner that it is easily accessible, compact, neat and attractive in appearance, and all the conductors leading from the unit are suitably inclosed and protected and are not in the way of other working parts.

My invention may be briefly summarized as consisting in certain novel details of construction and combinations and arrangements of parts which will be described in the specification and set forth in the appended claims.

Figure 1:
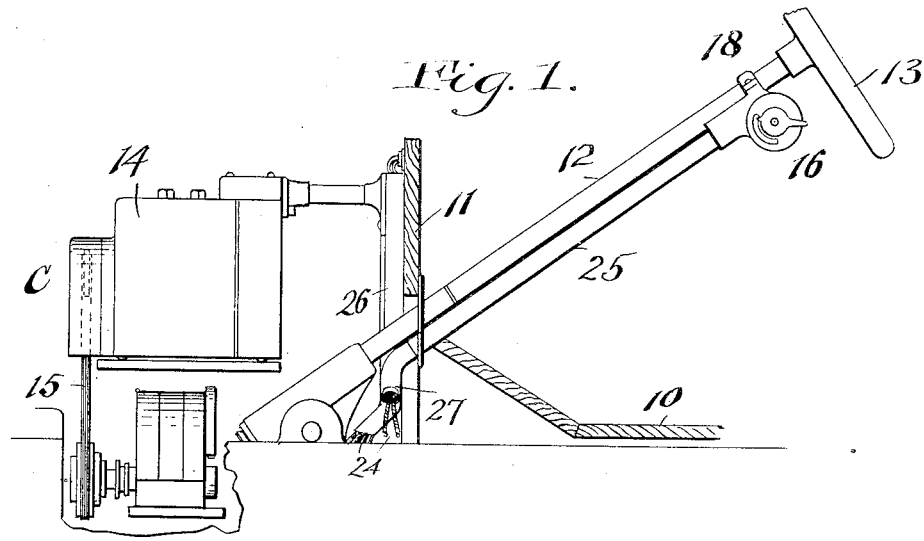
Figure 2:
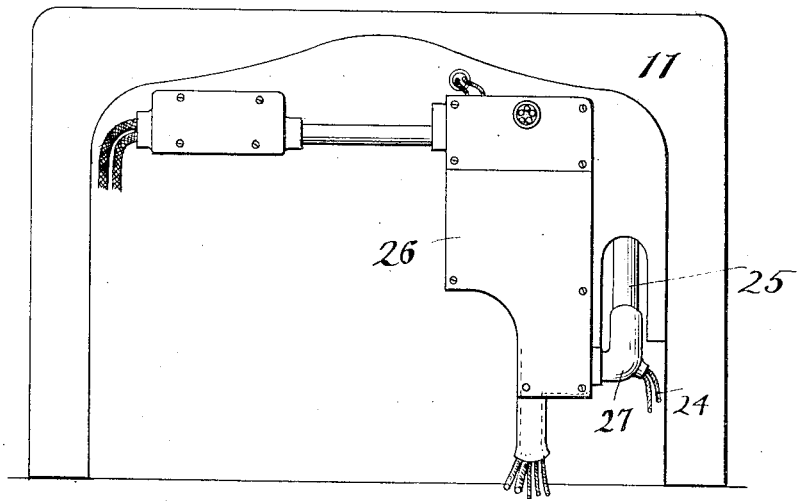

In the accompanying sheet of drawings, Figure 1 is a side view with parts in section of a portion of the motor vehicle to which my invention is applied; Fig. 2 is a front view of the dash; Fig. 3 is an enlarged end view of the switching unit, showing a portion of the steering column, and also a portion of the tube or conduit which extends from the switching unit and incloses the conductors; Fig. 4 is a sectional view substantially along the lines 4—4 of Fig. 3; Fig. 5 is a top plan view of the switching unit showing the steering column in section.

Referring now to the drawings, 10 represents a portion of the motor vehicle having a dash 11, a tubular steering column 12, a steering wheel 13, which will be secured in the usual manner to the rotary shaft extending through the column 12, the said column extending downwardly and forwardly through the lower part of the dash. At 14 is shown a dynamo-electric machine which will be connected to the engine by gearing, part of which is shown at 15, and which in this instance is adapted to serve as an engine starting motor, and as a lighting and battery charging generator after the engine is started.

In the control of the starting and lighting of the vehicle, I employ what I have termed a switching unit 16, which is carried by the steering column just beneath the steering wheel 12. This switching unit comprises a cylindrical casing 17 whose axis is at right angles to the axis of the steering column, and which is securely fastened to the latter by a clamp 18. This casing is provided with a downwardly extending hollow boss or tubular extension 19, which receives the end of the tube for the conductors as hereinafter explained, one side of this extension being grooved to receive the steering column, the grooved part extending upwardly slightly above the center part of the casing.

Fitted into the ends of the casing 17 are two switches 20 and 21, one of these switches being a starter controlling switch, and the other controlling the lamps, i. e., head, side and rear lamps. Both of these switches are of the rotary type, each including a handle 22 mounted for rotary movement about the axis of the casing 17. On the top of the casing there is provided a small push button or plunger type switch 23, which is utilized preferably for controlling the dash lamp or lamps.

The terminals of the three switches are on the interior of the casing, as shown, and the conductors which extend from these terminals pass down through the tubular extension 19 and through a tube 25, which is fitted into the end of the tubular extension 19 and extends downwardly alongside of the steering column 12 through the dash 11. It will be understood of course that the column 12, switch unit 16 and tube 25 are all stationary relative to the steering wheel 13 and the parts which turn therewith.

On the inner side of the dash is a junction box 26 into which the conductors 24 pass from the tube 25 through a short nipple or connecting tube 27. From this junction box the conductors pass to the dynamo-electric machine, battery and lamps, all the conductors being well protected and compactly arranged, and supported in such a manner that they do not interfere with other working parts and are not easily broken or disconnected.

The switch unit 16 is small and does not in any way interfere with the manipulation of the steering wheel. Furthermore, the shape and disposition of the switching unit are such that the switches are easily accessible to the operator or driver occupying the front seat of the vehicle.

Having thus described my invention, what I claim is:—

1. A control unit adapted to be secured to a steering column adjacent the hand wheel of a motor vehicle comprising a casing having a tubular body portion with openings at the ends thereof and an opening in the underside of the tubular portion of the casing, and switch members mounted in the openings at the ends thereof the opening at the underside thereof being adapted as an outlet for conductors from the switches.

2. A control unit adapted to be secured to a steering column adjacent the hand wheel of a motor vehicle, comprising a casing having a tubular body portion with openings at the ends thereof, switch members mounted in the said openings, said body also having opposed openings in the tubular portion thereof, a switch member mounted in one of said openings, the other of said last mentioned openings serving as an outlet for conductors from said switches.

3. A control unit adapted to be secured to a steering column adjacent the hand wheel of a motor vehicle comprising a casing having a tubular body portion with openings at the ends thereof, switch members mounted in said openings, said body also having openings in the tubular portion thereof, a switch member mounted in one of said openings in the tubular portion said casing having an extending neck surrounding the other opening in the tubular portion through which conductors from the switches may pass said neck being provided with means to receive a tubular conductor container.

In testimony whereof, I hereunto affix my signature in the presence of two witnesses.

RICHARD C. SCAIFE.

Witnesses:
A. J. HUDSON,
A. F. KWIS.